Patented Mar. 8, 1938

2,110,801

UNITED STATES PATENT OFFICE 2,110,801

METHOD OF CANNING TUNA, CLAMS, AND OYSTERS

Lawrence T. Hopkinson, Washington, D. C.

No Drawing. Application September 20, 1937, Serial No. 164,813

10 Claims. (Cl. 99—188)

This application is a continuation in part of my copending application Serial No. 127,771, filed February 25, 1937.

The invention relates to the production of a canned food product from marine material which naturally contains bacteria and enzymes and which becomes available at points remote from the equipment for canning the material. The method contemplated by the invention is specifically applied to the canning of tuna, clams and oysters.

The whole production of the tuna, clam and oyster fisheries falls naturally into two divisions. That part of the production which is fished sufficiently close to consumer centers to be delivered fresh to the ultimate consumer, whether under refrigeration or not, is handled fresh and not canned, because the fresh product in every case commands better prices than the canned goods. Canning is practiced only on that part of the production which is taken from the water too far from consumer centers to be transported to the consumer in the fresh state. In other words, no material is canned if it can be sold fresh, and the principal reason for canning any of these materials is the comparatively great distance which the material must be shipped and the resulting relatively long period over which it must be held. Hence, because of these facts and the conditions obtaining in the industries involved, the statement hereinabove that the method contemplated by the invention relates to the canning of tuna, clams and oysters means that for all practical purposes the method is applied to tuna, clam and oyster material which is fished at what may be considered "remote" points, that is to say, in waters too far away from consumer markets to permit the material to be delivered fresh to the consumer. Since it is not practicable and not customary to locate canning equipment at such points, these points may be further identified as being remote from the equipment for canning the material.

Most of the tuna which are canned are caught off the Pacific coast of South and Central America and in the waters off Japan, and the better grades of clams and oysters for canning are usually found at isolated points along the shores of the North Atlantic and North Pacific, principally in Canada and Japan. The catches are brought by the fishing or transporting boats to American canneries, and during the necessarily long passage the natural bacterial and enzyme content of the material requires that special steps be taken to prevent spoilage. These three materials present the same problem and in all three fisheries it is at the present time solved in the same way. The raw material is iced promptly after it is taken from the water and is kept iced until it is discharged at the cannery, where the material which is not too badly spoiled is cooked, packed into cans, sealed in the cans and then "processed," i. e., the sealed cans are heated in pressure retorts for a sufficient period to sterilize the contents.

This method has long been recognized as unsatisfactory because it is wasteful of material and expensive and because the resulting canned product compares very unfavorably with fresh cooked products of the same fisheries. The canners of tuna, clams, and oysters have long sought a method of producing canned products having a quality as closely approaching that of the fresh material as do the products of some other canning industries, for example the garden vegetable canning industry, but the long delay which must intervene between the fishing of the material and its sealing in cans has proved to be an insuperable bar to the production of canned goods really comparable to and competitive with fresh products. These three marine canning industries have therefore adhered to the method described above and have, by the proved failure of many proposed alternative methods, been forced to continue to produce canned material which is greatly inferior in texture and taste to the fresh products of the same fisheries.

There is an additional reason why these industries keep their raw materials under refrigeration until the cooking, canning and retorting sequence of operations at the cannery can begin. Receipts of raw material at the cannery are necessarily subject to violent fluctuations. During the fishing season a period of days may elapse between discharges of cargoes at a cannery, and on a single day a number of fishing boats may arrive with full cargoes. No cannery can keep pace with such fluctuations in receipts. In practice, therefore, the raw material, which has been iced on shipboard promptly after being taken from the water, is kept in cold storage at the cannery and drawn upon as cannery equipment and personnel become available to handle it. That is to say, for efficient cannery operation and to level out the labor load it is considered necessary under the present practice for the cannery to have available a store of frozen or refrigerated raw material on which to draw. From the standpoint of cannery efficiency and uniformity of labor load this expedient is satisfactory, but from the standpoint of the quality of the canned product the method is decidedly objectionable for the following reasons among others:

(1) During freezing the cells of the raw material become ruptured and valuable juices are exuded on thawing. To a large extent even those juices which remain physically in the material through the freezing and thawing are squeezed from their normal and original intra-cellular or inter-cellular occupancy, to the great impairment of the flavor and texture of the final, cooked product. Experiments have been made with quick freezing, but the product was found to be only partially improved and the experiments have been abandoned as not justifying the expense of installing and operating quick-freezing equipment on the fishing vessels or elsewhere. The reason for the failure of quick freezing is probably the fact that even in quick-frozen material ice crystals grow to large size during even a comparatively short period of storage. Again, it is impossible to subject to quick freezing the interior portions of a fairly large fish carcass. The outer layer of ice and frozen meat which is promptly formed seems effectively to insulate the interior and materially retard heat transfer as the freezing operation proceeds.

(2) Freezing does not by any means perfectly preserve raw fish material. On the contrary, enzyme and bacterial actions proceed in the frozen material, not as rapidly, it is true, as in unfrozen material, but with sufficient rapidity to cause spoilage or partial spoilage if the material be kept too long and to impair noticeably the taste and quality of the final product if the material be kept frozen over even a comparatively short period. Raw material of the tuna, clam and oyster group, even when strictly fresh, contains enzymes and bacteria in great abundance and these enzymes and bacteria are the principal causes of spoilage. Refrigeration, even to the point of freezing, only partially destroys them, and spoilage proceeds as in unfrozen material, although at a slower rate. It is a fact that tuna, clam and oyster material which is cooked after being fresh frozen and held frozen for the periods usually necessary to transport the material to the nearest cannery and to await its turn at the canning equipment is noticeably inferior in taste and texture to otherwise similar material which is cooked and canned as soon as it is taken from the water.

There are further reasons why tuna, clam and oyster material is impaired by the necessity of freezing, but the foregoing are typical and probably constitute the most important factors.

A primary object of the present invention is therefore the production of canned food products of the tuna, clam and oyster fisheries having greatly improved qualities in respect principally of taste and texture.

Another object of the invention is the reduction of waste of material, loss of material, and cost of handling.

A specific object is reduction of the time and temperature of the final processing operation, and a closely related object is reduction of the bacterial and enzyme content of the newly canned product, i. e., of the product in the sealed but as yet unprocessed cans. Because the material at this stage of the new method is comparatively sterile, the processing time may be shortened and/or the processing temperature may be lowered, so that the objectionable effects of overcooking may be avoided.

Other objects and advantages of the method will be apparent to those skilled in the art and will be obvious from the explanation which will now be given of a preferred embodiment of the method.

Essentially, the present invention contemplates cooking the fresh material before spoilage can begin, then refrigerating the cooked material, sealing the same in containers, and finally subjecting the sealed material to a sterilizing temperature.

The fresh material is cooked before spoilage has an opportunity to begin. Obviously, therefore, the cooked material is of the highest possible quality and no further processing would be required if the food could be placed immediately in the hands of the ultimate consumer. As has been pointed out, this is not possible in the case of tuna, clams and oysters which are to be canned. It is necessary therefore to maintain the cooked product against spoilage long enough to transport it to the canning equipment and to await its turn as equipment and personnel become available to handle the material. My invention contemplates effecting this maintenance by refrigeration, and this step in the new process differs from the freezing step of the conventional method universally and exclusively practiced in the tuna, clam and oyster canning industries in that I refrigerate cooked material instead of raw material.

I have found that there is a great difference in the effects of the two steps just contrasted. I have explained hereinabove some reasons why raw frozen material deteriorates and results in an ultimate product of inferior quality. The factors which produce these undesirable effects are eliminated when the material which is refrigerated has previously been cooked. Thus, cooking coagulates the protein, including the valuable and desirable constituents of the juices which are consequently not squeezed out by freezing and are not lost by freezing or thawing. Cooking also completely destroys enzymes and bacteria, and if simple, ordinary precautions are taken to protect the cooked material against reinfection spoilage positively cannot occur while it remains under adequate refrigeration during the period normally required for transportation to the cannery or storage at the cannery prior to the can sealing and retorting operations. After any ordinary period of delay in transportation and holding at the cannery the bacterial and enzyme count is found to be extremely low and the material may be sealed in cans in substantially sterile condition.

An important factor in the impairment of taste and texture referred to hereinabove is the necessity of heating the canned material of the prior art to a high temperature and for a long period of time to sterilize it. This final sterilizing operation is known in the industry as "processing" and is made necessary by the bacterial and enzyme content of the material. Because material handled in accordance with the present invention reaches the canning equipment with an extremely low bacterial and enzyme count, as has been pointed out hereinabove, the "processing" or final sterilizing time and temperature may be materially reduced in comparison with the time and temperature required for material which has been refrigerated in the raw state and held for canning, with the result that the final product of the new method very substantially excels that of the old method in point of taste and texture. Thus, in addition to obtaining a better product, I effect an important economy in the cost of fuel for processing and, by decreasing the time which the material must spend in the retorts, I correspondingly increase the capacity of the retorts and of the cannery.

There are other advantages in cooking the material before refrigerating rather than afterward. Volume for volume, the cooked material contains less water than raw material, so that its specific heat is materially lower and less refrigerating effort is required to lower its temperature. A further refrigerating economy is effected because it is not necessary, when cooked material is being chilled, to extract heat from the large quantity of water present in raw material. Moreover, cooked material can be refrigerated more quickly and cheaply for an added reason: Cooked fish material of the types on which the present invention is practiced, particularly tuna meat, is very porous. Even small pieces contain cracks and fissures in addition to the uniformly open cellular structure of the mass. Raw material of the same species is dense enough to be substantially impermeable to liquids. This difference in flesh structure makes it far easier and less expensive to extract heat from the interior of a piece of cooked material than from a piece of raw material of the same size and shape. Again, quite apart from the elimination of water, the volume of cooked material is additionally reduced if such material as tuna be cleaned prior to cooking, as it is in the preferred embodiment of my method. The cleaning operation eliminates the heads, entrails, tails, etc., for all of which in my process no refrigeration expense is incurred.

A preferred, complete embodiment of the invention may be described as follows:

As soon as the material, whether tuna, clam or oyster, is taken from the water, it may be packed in ice on shipboard exactly as in the case of the prior art method, and thereafter cooked as soon as possible, on shipboard or at a shore plant, whichever is more convenient, or the material may be promptly cooked without the interposition of the initial chilling step. The choice will depend on conditions; in any event, the material is cooked before spoilage has a chance to begin and without freezing the raw material to await cannery convenience or availability. The cooking is done at temperatures sufficient substantially to sterilize the material. The cooked material is then placed in containers and refrigerated and is kept under refrigeration and protected from outside contamination until it can be canned, i. e., sealed in containers such as tins, jars or the like and sterilized in the sealed containers by the application of heat. The usual step of adding condiments may be practiced at any suitable stage of the method, before the tins, jars or the like are sealed and "processed," i. e., subjected to a final sterilizing heating operation. Because, as has been pointed out, the newly canned, i. e., as yet unprocessed, material is practically sterile, or at least is of extremely low bacterial and enzyme content as compared with the newly canned (unprocessed) product of the prior art method, the sterilizing or "processing" time and temperature may be very materially reduced as compared with those required in practice of the prior art method. In other words, my newly canned product is sufficiently processed by the application of a low temperature for a short period.

The detrimental effects on taste and texture of prolonged heating during the "processing" operation are thus avoided and the final product as sold to the ultimate consumer compares very favorably with material which is cooked and eaten fresh, i. e., with no intervening refrigerating and canning steps.

The refrigerating temperature required by my method is a matter for selection and will depend on circumstances. Material that is to be kept a comparatively long time before being canned may be frozen, but chilling to temperatures somewhat above the freezing point will be sufficient to keep the cooked material in excellent condition for relatively short periods. Frozen material will normally be thawed before being sealed up in the ultimate containers.

When the refrigerated, cooked material is to be held or transported over a considerable period, I prefer to freeze it and cover it with a glaze frozen from water, oil or the like to retard or prevent evaporation, oxidation and discoloration. This glaze may be comparatively thick or relatively thin and the liquid from which it is frozen may be the natural juice of the fish material. A mass of material may be frozen in a solid block. A convenient way to practice the glazing operation is to freeze the cooked material and dip it in the coating liquid, or the material may be surrounded with the liquid either before or after it has been frozen. In the case of tuna I prefer not only to cover the outer surface of the cooked material with an ice glaze deposited from water or oil, but to fill with ice all the interstices of the cooked material. This may be accomplished by covering the unfrozen material with the liquid and then freezing the entire mass. In the case of clams and oysters best results are obtained when the solid material is completely immersed in its natural juices or water or oil and then frozen therein in the form of a solid block. This block may be given an additional ice glaze for added protection.

Various modifications and refinements are within the scope of the invention. Thus, in the case of tuna, the fish need not be dressed prior to cooking, although I prefer to dress it for the reasons explained hereinabove. After cooking, the tuna, clam or oyster material may be refrigerated in the containers which will ultimately be sealed and in which the product will be supplied to the consumer, or temporary containers may be used during refrigeration. If the ultimate container is used at this stage of the process it is kept unsealed because it is prohibitively costly to provide can-sealing equipment where the cooking must be done, as has been explained, and because the unsealed can will accommodate expansion of the refrigerated material without becoming ruptured or distorted. Metal cans are of course ideally suited to contain matter to be refrigerated because the metal is an excellent conductor of heat and because the cans can be stacked with spaces between them for circulation of cold air or other refrigerating medium.

In the foregoing specification:

"Canned food product" means a nutritional material for human or animal consumption packed in an air-tight container made of metal, glass, or other impervious material, either with or without a vacuum in the container, and with or without added condiments such as spices, salt, or oil.

"Processing" means heating material in sealed containers to a sufficiently high temperature to substantially destroy bacteria and enzymes, the heat being applied either with or without pressure.

"Canning equipment" means machinery for sealing food material in air-tight containers and equipment, such as a retort, for subjecting the sealed material to processing.

I claim:

1. The method of producing a canned food product from tuna fish which naturally contain bacteria and enzymes and which are caught at sea remote from the equipment for canning said material, said method consisting in selecting the fresh, raw fish in which bacterial and enzyme action has not progressed substantially, cooking said material sufficiently to substantially destroy its bacterial and enzyme content, refrigerating the meat, transporting the refrigerated meat to said canning equipment and holding the meat under refrigeration during transportation so as substantially to prevent the development of bacteria and enzymes and substantially to check bacterial and enzyme action, sealing the meat in containers, and then heating the sealed containers sufficiently to effect final sterilization.

2. The method of producing a canned food product from tuna fish which naturally contain bacteria and enzymes and which are caught at sea remote from the equipment for canning said material, said method consisting in selecting the fresh, raw fish in which bacterial and enzyme action has not progressed substantially, cooking said material sufficiently to substantially destroy its bacterial and enzyme content, refrigerating the meat in a container, transporting the refrigerated meat in said container to said canning equipment and holding the meat under refrigeration during transportation so as substantially to prevent the development of bacteria and enzymes and substantially to check bacterial and enzyme action, sealing the meat in said container, and then heating the sealed container sufficiently to effect final sterilization.

3. The method of producing a canned food product from tuna fish which naturally contain bacteria and enzymes and which are caught at sea remote from the equipment for canning said material, said method consisting in selecting the fresh, raw fish in which bacterial and enzyme action has not progressed substantially, cooking said material sufficiently to substantially destroy its bacterial and enzyme content, packing the cooked meat in a container, refrigerating the packed meat, transporting the refrigerated meat to said canning equipment and holding the meat under refrigeration during transportation so as substantially to prevent the development of bacteria and enzymes and substantially to check bacterial and enzyme action, sealing the meat in said container, and then heating the sealed container sufficiently to effect final sterilization.

4. The method of producing a canned food product from fish material of the group consisting of tuna, clams and oysters which naturally contain bacteria and enzymes and which are taken from their natural habitat remote from the equipment for canning said material, said method consisting in selecting the fresh, raw material in which bacterial and enzyme action has not progressed substantially, cooking said material sufficiently to substantially destroy its bacterial and enzyme content, refrigerating the meat, transporting the refrigerated meat to said canning equipment and holding the meat under refrigeration during transportation so as substantially to prevent the development of bacteria and enzymes and substantially to check bacterial and enzyme action, sealing the meat in containers, and then heating the sealed containers sufficiently to effect final sterilization.

5. The method of producing a canned food product from fish material of the group consisting of tuna, clams and oysters which naturally contain bacteria and enzymes and which are taken from their natural habitat remote from the equipment for canning said material, said method consisting in selecting the fresh, raw material in which bacterial and enzyme action has not progressed substantially, cooking said material sufficiently to substantially destroy its bacterial and enzyme content, refrigerating the meat in a container, transporting the refrigerated meat in said container to said canning equipment and holding the meat under refrigeration during transportation so as substantially to prevent the development of bacteria and enzymes and substantially to check bacterial and enzyme action, sealing the meat in said container, and then heating the sealed container sufficiently to effect final sterilization.

6. The method of producing a canned food product from fish material of the group consisting of tuna, clams and oysters which naturally contain bacteria and enzymes and which are taken from their natural habitat remote from the equipment for canning said material, said method consisting in selecting the fresh, raw material in which bacterial and enzyme action has not progressed substantially, cooking said material sufficiently to substantially destroy its bacterial and enzyme content, packing the cooked meat in a container, refrigerating the packed meat, transporting the refrigerated meat to said canning equipment and holding the meat under refrigeration during transportation so as substantially to prevent the development of bacteria and enzymes and substantially to check bacterial and enzyme action, sealing the meat in said container, and then heating the sealed container sufficiently to effect final sterilization.

7. The method of producing a canned food product from clam material which naturally contains bacteria and enzymes and which is taken from the water at points remote from the equipment for canning said material, said method consisting in selecting the fresh, raw material in which bacterial and enzyme action has not progressed substantially, cooking said material sufficiently to substantially destroy its bacterial and enzyme content, refrigerating the meat, transporting the refrigerated meat to said canning equipment and holding the meat under refrigeration during transportation so as substantially to prevent the development of bacteria and enzymes and substantially to check bacterial and enzyme action, sealing the meat in containers, and then heating the sealed containers sufficiently to effect final sterilization.

8. The method of producing a canned food product from oyster material which naturally contains bacteria and enzymes and which is taken from the water at points remote from the equipment for canning said material, said method consisting in selecting the fresh, raw material in which bacterial and enzyme action has not progressed substantially, cooking said material sufficiently to substantially destroy its bacterial and enzyme content, refrigerating the meat, transporting the refrigerated meat to said canning equipment and holding the meat under refrigeration during transportation so as substantially to prevent the development of bacteria and enzymes and substantially to check bacterial and enzyme action, sealing the meat in containers, and then heating the sealed containers sufficiently to effect final sterilization.

9. The method of producing a canned food product from fish material of the group consisting of tuna, clams and oysters which naturally contain bacteria and enzymes and which are taken from their natural habitat at points remote from the equipment for canning said material, said method consisting in selecting the fresh, raw material in which bacterial and enzyme action has not progressed substantially, cooking said material sufficiently to substantially destroy its bacterial and enzyme content, freezing the material, transporting the frozen material to said canning equipment and holding the material under refrigeration during transportation so as substantially to prevent the development of bacteria and enzymes and substantially to check bacterial and enzyme action, sealing the material in containers, and then heating the sealed containers sufficiently to effect final sterilization.

10. The method of producing a canned food product from fish material of the group consisting of tuna, clams and oysters which naturally contain bacteria and enzymes and which are taken from their natural habitat at points remote from the equipment for canning said material, said method consisting in selecting the fresh, raw material in which bacterial and enzyme action has not progressed substantially, cooking said material sufficiently to substantially destroy its bacterial and enzyme content, freezing the material, producing a protective outer surface glaze of frozen liquid on the material, transporting the frozen material to said canning equipment and holding the material under refrigeration during transportation so as substantially to prevent the development of bacteria and enzymes and substantially to check bacterial and enzyme action, sealing the material in containers, and then heating the sealed containers sufficiently to effect final sterilization.

LAWRENCE T. HOPKINSON.